(12) United States Patent
Chi et al.

(10) Patent No.: US 6,677,931 B2
(45) Date of Patent: Jan. 13, 2004

(54) KEYBOARD

(75) Inventors: Ching-Shou Chi, Shindian (TW); Yang-Wei Wu, Taipei (TW); Hsi-Fu Chang, Shindian (TW)

(73) Assignee: Leadtek Research Inc., Taipei (TW)

( * ) Notice: Subject to any disclaimer, the term of this patent is extended or adjusted under 35 U.S.C. 154(b) by 149 days.

(21) Appl. No.: 09/799,702

(22) Filed: Mar. 7, 2001

(65) Prior Publication Data

US 2001/0055003 A1 Dec. 27, 2001

(30) Foreign Application Priority Data

Jun. 21, 2000 (TW) .................................... 89210675 U

(51) Int. Cl.$^7$ ................................................ G09G 5/00
(52) U.S. Cl. .................... 345/170; 345/168; 345/169; 341/22; 341/23; 341/24
(58) Field of Search ................... 345/168, 169, 345/170; 341/22, 23, 24

(56) References Cited

U.S. PATENT DOCUMENTS

| | | | | |
|---|---|---|---|---|
| 5,021,771 A | * | 6/1991 | Lachman | 273/148 B |
| 5,083,240 A | * | 1/1992 | Pasco | 362/26 |
| 5,667,319 A | * | 9/1997 | Satloff | 341/22 |
| 5,813,861 A | * | 9/1998 | Wood | 434/169 |
| 5,864,334 A | * | 1/1999 | Sellers | 345/156 |
| 6,177,925 B1 | * | 1/2001 | Soloway | 341/156 |
| 6,259,049 B1 | * | 7/2001 | Nakai | 200/308 |

* cited by examiner

*Primary Examiner*—Richard Hjerpe
*Assistant Examiner*—Jean Lesperance
(74) *Attorney, Agent, or Firm*—Rabin & Berdo, P.C.

(57) ABSTRACT

A keyboard with a numbers of keys disposed on the base is capable of showing the three-dimensional characters. Each key includes a shell and a three-dimensional character embedded in the shell. Combined with an illuminant module positioned between the base and keys for providing the light source, the three-dimensional characters can be shown clearly and distinguishably by utilizing the color contrast relation with light between the light-colored transparent three-dimensional characters and dark-colored or opaque shells.

9 Claims, 3 Drawing Sheets

KEYBOARD

BACKGROUND OF THE INVENTION

This application incorporates by reference Taiwanese application Serial No. 89210675, Filed Jun. 21, 2000.

1. Field of the Invention

The invention relates in general to a keyboard, and more particularly to a keyboard with the keys capable of showing the three-dimensional characters.

2. Description of the Related Art

With the rapid development of the computer and communication technologies, people nowadays living in the global village can communicate easily and conveniently by making a phone call or surfing the net through the computer system or communication system whenever they want, wherever they are. A keyboard is an indispensable component of every input device. A keyboard typically has a number of keys representing Arabic numerals (0~9), the English alphabet (A~Z), various symbols (#, *, +, / . . . ), and letters or patterns to illustrate some functions. It is easy to record names, telephone numbers, dates and time schedules or to make operations (as with a calculator) by utilizing the keyboard. The keyboard can use switches or membranes combined with conductive rubber to enhance the functions thereof.

The traditional method for manufacturing a keyboard illuminated, either the color of the character is darker or lighter than the key body, is to print a character on the top or bottom surface of the key body. The ROC Patent Publication No. 285345 discloses that a character is printed on the bottom of the transparent key by opaque printing ink. Besides, the ROC Patent Publication No. 311229 discloses that the printing ink and paint are first printed on the surface of the transparent key and the light-permeable parts thereof are then scraped. Therefore, the illuminated keyboard made by the conventional method does not have the keys capable of showing the three-dimensional characters

SUMMARY OF THE INVENTION

It is therefore an object of the invention to provide a keyboard, the characters inside the keys are formed by molds and integrated within the shells. Combined with a luminescent board or Light Emitting Diodes (LED), the illuminated key can show the three-dimensional character clearly and distinguishably by utilizing the color contrast relation with light between the textures of three-dimensional characters and shells.

The invention achieves the above-identified objects by providing a keyboard, wherein the keyboard includes a base, a numbers of keys and an illuminant module. The keys are disposed on the base and each key includes a shell and a three-dimensional character embedded in the shell. The shells are made of colorless transparent or light-colored transparent texture while the three-dimensional characters are made of dark-colored transparent or opaque texture. The dark-colored three-dimensional character embedded in the transparent shell can be naturally presented. Furthermore, combined with an illuminant module positioned between the base and keys, the three-dimensional characters can be shown clearly and distinguishably while the light goes through the transparent three-dimensional characters. It enables the keys to be visible not only in the daytime but also in the nighttime or insufficient light conditions.

The invention achieves the above-identified objects by providing another keyboard, wherein the keyboard includes a base, a numbers of keys and an illuminant module. The keys are disposed on the base and each key includes a shell and a three-dimensional pillared character embedded in the shell. The top surface of the three-dimensional pillared character is equal-elevated relative to and connected to the surface of the shell. The three-dimensional pillared characters are made of light-colored transparent texture while the shells are made of dark-colored transparent or opaque texture. Furthermore, combined with an illuminant module positioned between the base and keys, the three-dimensional pillared characters can be shown clearly and distinguishably while the light goes through the transparent three-dimensional pillared characters. It enables the keys to be visible not only in the daytime but also in the nighttime or insufficient light conditions.

BRIEF DESCRIPTION OF THE DRAWINGS

Other objects, features, and advantages of the invention will become apparent from the following detailed description of the preferred but non-limiting embodiments. The description is made with reference to the accompanying drawings in which.

DESCRIPTION OF THE PREFERRED EMBODIMENT

In the following preferred embodiment of the invention, the number (0~9) keys, # key and * key of the keyboard are taken for example. The keys of letters, symbols, numerals or function keys can be also placed instead for applying in different appliances so that the disclosure will be thorough and complete without departing the spirit and scope of this invention.

Figure 1A:
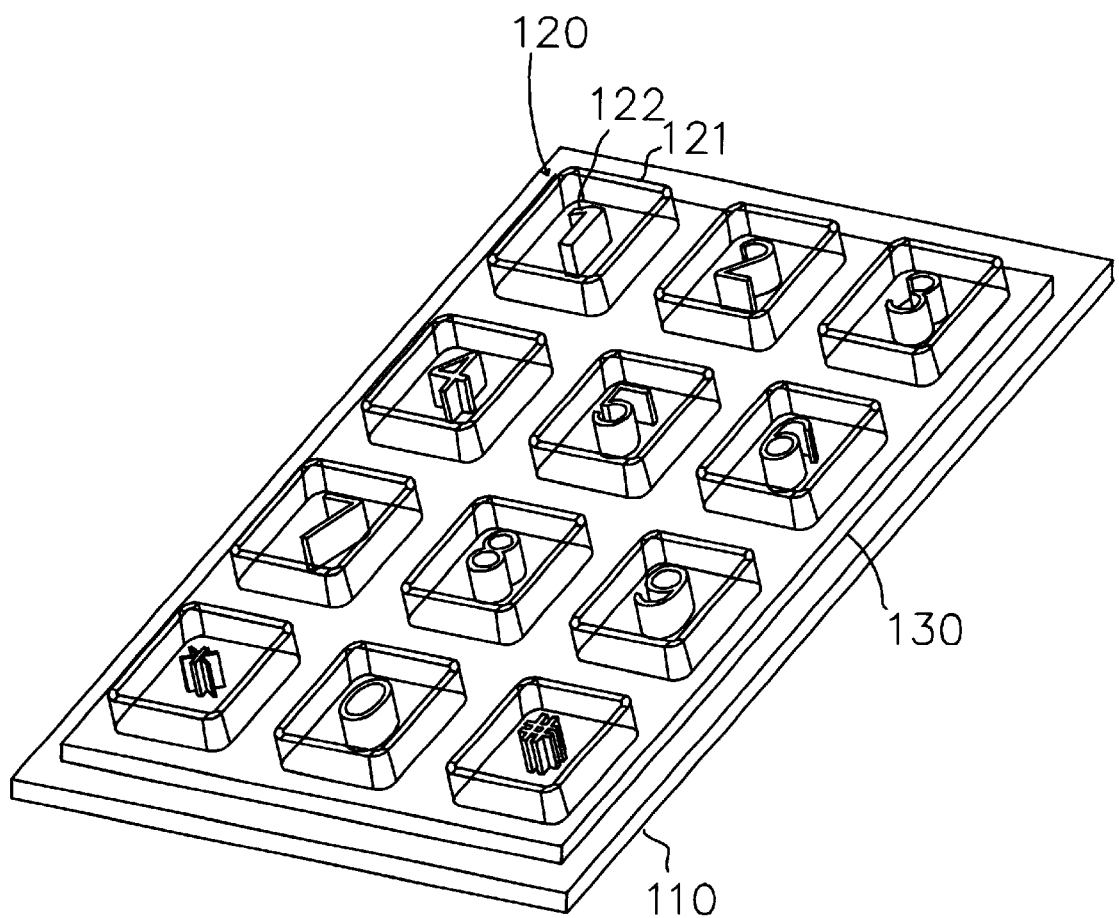
FIG. 1A shows a perspective view of a keyboard (not including frames of the keyboard surface) according to the preferred embodiment.

Referring first to FIG. 1A, a perspective view of a keyboard (not including frames of the keyboard surface) according to the preferred embodiment is shown. The keyboard 100 includes a base 110, a numbers of keys 120 and an illuminant module 130. The keys 120 disposed on the base 110 are the number keys 0~9 and symbol keys #, * or the like which are arranged in arrays with interval.

Besides, the key 120 further includes a shell 121 and a three-dimensional character 122 embedded in the shell 121, wherein the three-dimensional character 122 is the Arabic numerals 0~9 or the symbols #, * or the like and is a character with irregular cylinder-shaped as shown in FIG. 1A.

The foregoing illuminant module 130, which is positioned between the base 110 and the keys 120, provides the light source to display the three-dimensional characters 122. The illuminant module 130 is a light source providing device such as a luminescent board 130a as shown in FIG. 1B, a numbers of Light Emitting Diodes (LED) 130b as shown in FIG. 1C or the like.

Figure 1B:
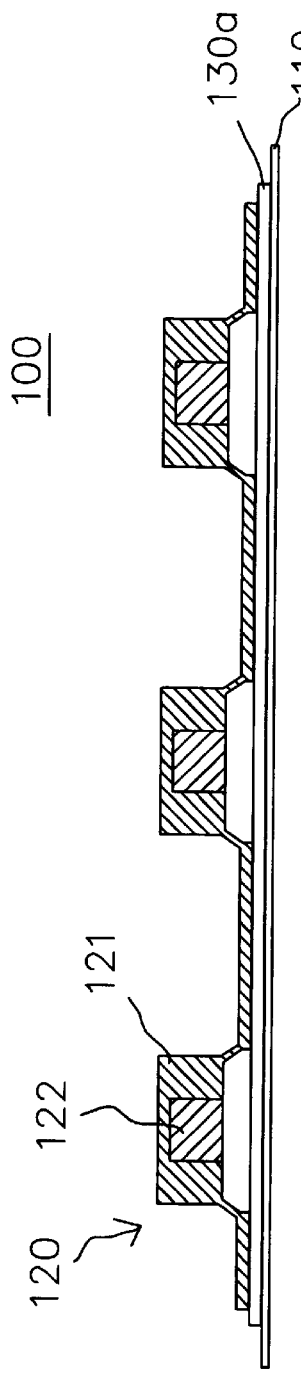
FIG. 1B illustrates a cross-sectional view of a keyboard with an illuminant module of FIG. 1A.

In FIG. 1B, a whole piece of the luminescent board 130a positioned between the base 110 and the keys 120 can make all the covering scope bright. In FIG. 1C, the LED 130b disposed beneath each key can make the keys 120 radiate individually.

The shell 121 made up of plastics, silica gel or rubber is light-colored transparent or colorless transparent. And the three-dimensional character 122 made up of plastics, silica gel or rubber is dark-colored transparent or opaque. Utilizing the color contrast between the shell 121 and three-dimensional character 122, it enables the key 120 to display the three-dimensional character 122 shown in the shell 121.

Figure 1C:
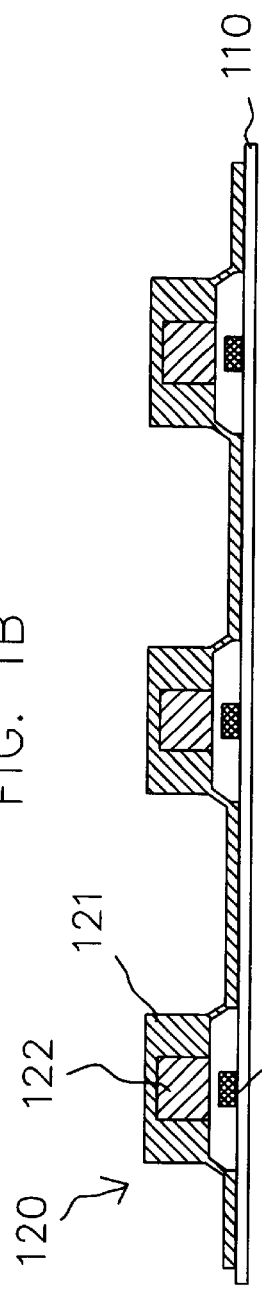
FIG. 1C illustrates a cross-sectional view of a keyboard with another illuminant module of FIG. 1A.
Figure 1D:
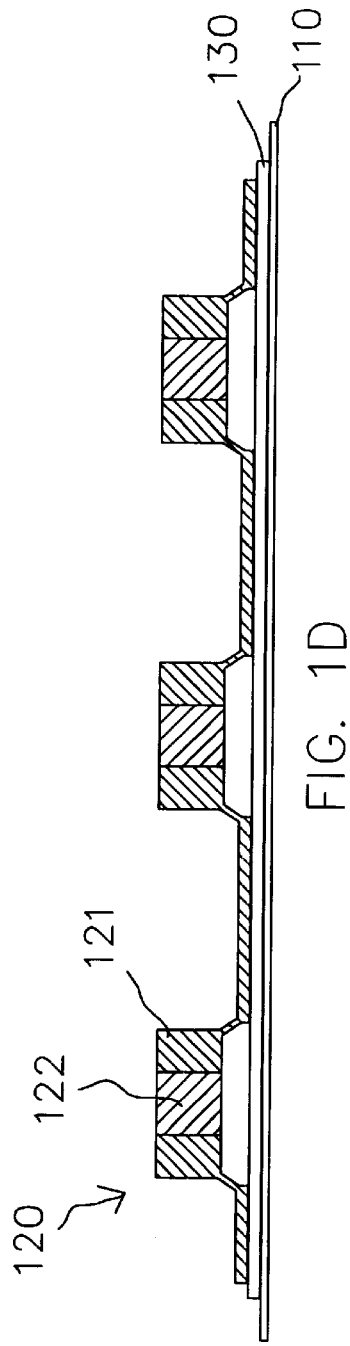
FIG. 1D illustrates a cross-sectional view of a structure that the top of the three-dimensional character is connected to the key top.

Moreover, in FIGS. 1A~1C, the three-dimensional character 122 is completely covered inside the shell 121. For practically implement, however, the top surface of the three-dimensional character 122 can be equal-elevated relative to the shell 121 as shown in FIG. 1D. In this case, the color of the shell 121 and the three-dimensional character 122 in contrast status can be exchanged. That is to say, the shell 121 key body 400 is made of dark-colored transparent or opaque texture and the three-dimensional character 122 is made of colorless or light-colored transparent texture. Combined with an illuminant module 130, the key 120 can show the three-dimensional character 122 clearly and distinguishably while the light goes through the transparent three-dimensional character 122. It enables the keys 120 to be visible not only in the daytime but also in the nighttime or insufficient light conditions.

The key 120 having three-dimensional characters 122 can be manufactured by several methods. For instance, the shell 121 is first formed by a mold and then injected with a texture for forming the three-dimensional characters 122 by the same mold. The key 120 is thus shaped by one mold. It also can be manufactured by two independent molds for producing the shell 121 and the three-dimensional character 122 respectively, wherein the three-dimensional character 122 is made of solid plastic. After shaping the three-dimensional character 122 and the shell 121, the three-dimensional character 122 is embedded in the shell 121 by man or machines. And the key 120 is then shaped.

Figure 2:
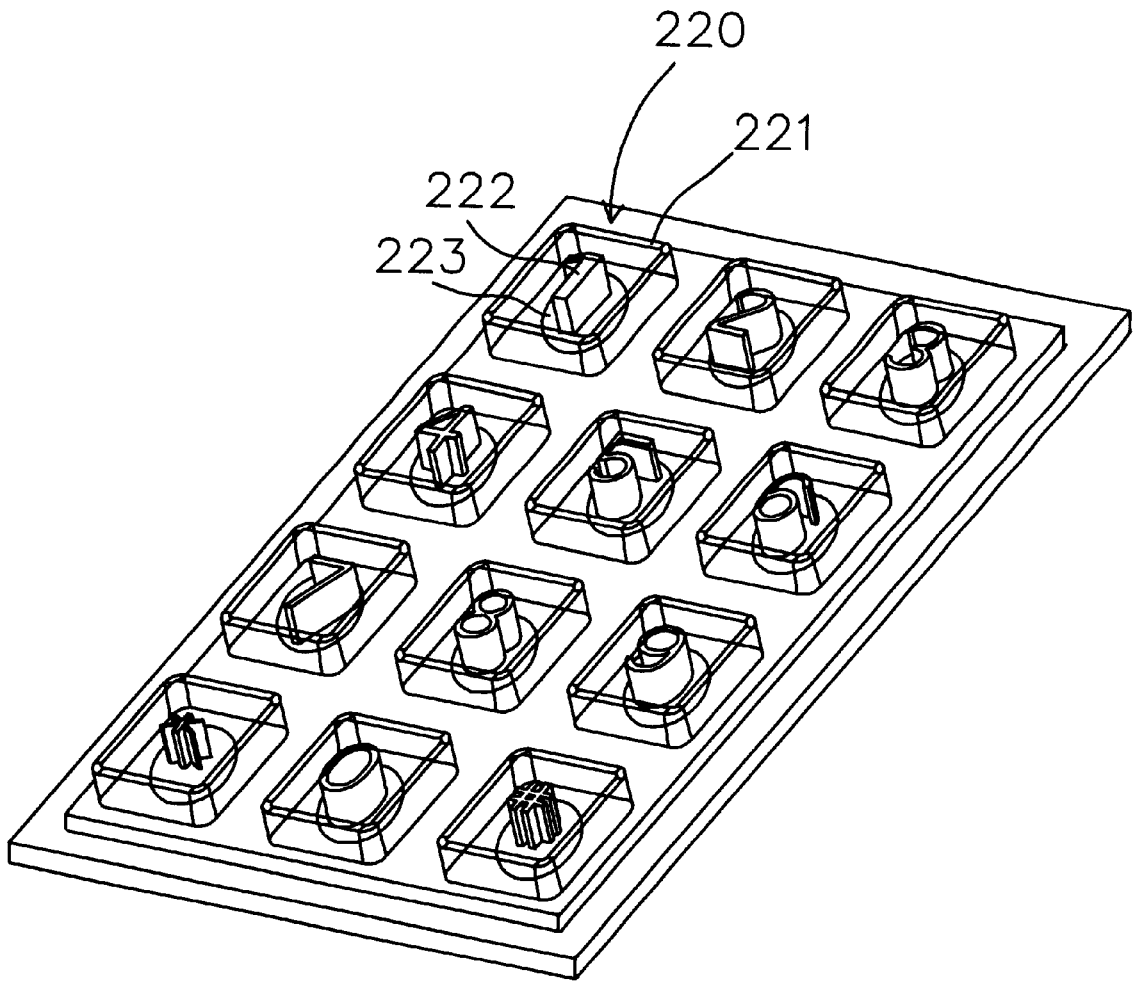
FIG. 2 shows a perspective view of another keyboard (not including frames of the keyboard surface) according to the preferred embodiment of the invention.

Furthermore, referring to FIG. 2, a perspective view of another keyboard (not including frames of the keyboard surface) according to the preferred embodiment of the invention is shown. The key 220 includes a shell 221, a three-dimensional character 222 and a seat 223 (taking round shape in the FIG., but not restricted). The three-dimensional character 222 and the seat 223 are made of the same texture and formed in the meanwhile. The interrelation and the manufacturing method of the shell 221, the three-dimensional character 222 and the seat 223 are the same as the keyboard shown in FIG. 1A, which have been described in detail.

The keyboard according to the invention, the dark-colored transparent or opaque three-dimensional characters are integrated within the colorless or light-colored transparent shells. On the other hand, the colorless or light-colored transparent three-dimensional characters are integrated within the dark-colored transparent or opaque shells. Combined with a luminescent board or Light Emitting Diodes (LED), the illuminated key can show the three-dimensional character clearly and distinguishably by utilizing the color contrast relation with light between the textures of three-dimensional characters and shells. It enables the keyboard with bright and dazzling keys to be visible not only in the daytime but also in the nighttime or insufficient light conditions. Therefore, it enhances the attractiveness and practicability of the product with keyboard such like the communication devices, terminal equipment or other appliances.

While the invention has been described by way of example and in terms of the preferred embodiment, it is to be understood that the invention is not limited to the disclosed embodiment. To the contrary, it is intended to cover various modifications and similar arrangements and procedures, and the scope of the appended claims therefore should be accorded the broadest interpretation so as to encompass all such modifications and similar arrangements and procedures.

What is claimed is:

1. A keyboard, comprising:
    a base; and
    a plurality of keys disposed on the base, wherein each key comprises:
        a transparent shell, having a top surface; and
        a three-dimensional character embedded in the shell, having a top surface that is substantially flush with the top surface of the shell; and
        an illuminant module for providing a light source to display the three-dimensional characters, positioned between the base and the keys.

2. The keyboard according to claim 1, wherein the shells and the three-dimensional characters are made of dark-colored and light-colored materials respectively.

3. The keyboard according to claim 1, wherein the shells and the three-dimensional characters are made of light-colored and dark-colored materials respectively.

4. The keyboard according to claim 1, wherein the illuminant module comprises a plurality of Light Emitting Diodes (LED), and wherein the Light Emitting Diodes disposed beneath the keys are capable of showing the three-dimensional characters.

5. The keyboard according to claim 1, wherein the illuminant module is a luminescent board.

6. The keyboard according to claim 1, wherein the shells are made of plastics, silica gel or rubber.

7. The keyboard according to claim 1, wherein the three-dimensional characters are made of plastics, silica gel or rubber.

8. The keyboard according to claim 1, wherein the three-dimensional character comprises a pillared character.

9. The keyboard according to claim 1, wherein the three-dimensional character comprises a pillared character and a seat.

* * * * *